(No Model.)

C. W. SHARTLE.
CHUCK.

No. 339,336. Patented Apr. 6, 1886.

WITNESSES:
Th. Rolle.
W. F. Kircher.

INVENTOR
Charles W. Shartle
BY
John A. Wiedersheim
ATTORNEY.

UNITED STATES PATENT OFFICE.

CHARLES W. SHARTLE, OF PHILADELPHIA, PENNSYLVANIA.

CHUCK.

SPECIFICATION forming part of Letters Patent No. 339,336, dated April 6, 1886.

Application filed January 23, 1886. Serial No. 189,445. (No model.)

*To all whom it may concern:*

Be it known that I, CHARLES W. SHARTLE, a citizen of the United States, residing in the city and county of Philadelphia, State of Pennsylvania, have invented a new and useful Improvement in Lathe Carriers or Chucks, which improvement is fully set forth in the following specification and accompanying drawings, in which—

Figure 1:
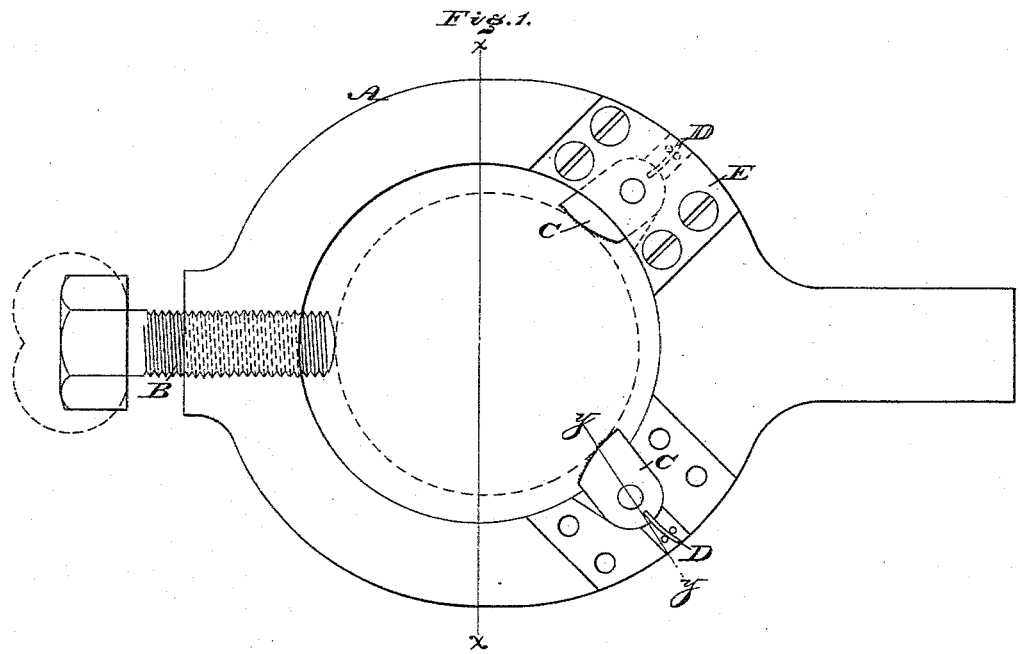
Figure 2:
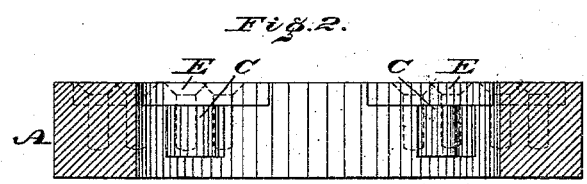
Figure 3:
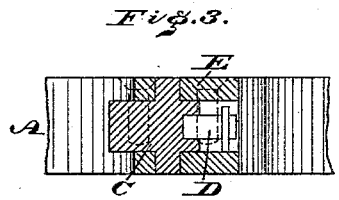

Figure 1 represents a face view of a lathe carrier or chuck embodying my invention, one of the plates of the same being removed. Fig. 2 represents a section thereof on line $x\,x$, Fig. 1. Fig. 3 represents a section on line $y\,y$, Fig. 1.

Similar letters of reference indicate corresponding parts in the several figures.

My invention consists in providing a lathe carrier or chuck with jaws which firmly bite the shafting, tubing, or other article, and which may be released in a convenient manner.

Referring to the drawings, A represents a stock which is annular in form and adapted to receive within it the shafting, tubing, or other article to be driven. Through the stock is fitted a set-screw, B, which may be operated by hand, or any suitable wrench or tool, the same being adapted to have its point come in contact with the shafting or other article in the the stock. To the stock are pivoted jaws C C, whose working-faces project into the central opening of the stock and extend in curved directions eccentric to the axis of the jaws, the same being adapted to bear against the article to be driven at places opposite to the set-screw B.

It will be seen that when the carrier is in operation the article to be driven is tightened against the set-screw and jaws, and owing to the eccentric faces of the jaws said jaws move on their axes and take firmer hold on the article, the bite increasing with the resistance of the article, hence the latter is most securely held, the holding action of the jaws being increased by serrations formed in their faces.

In order to release the article, the carrier is slightly moved by hand in a direction the reverse to which it is driven, whereby the jaws loose their holding action on the article, and the latter is free to be withdrawn from the carrier without loosening the screw.

In order to hold the jaws in their normal position, ready to bite the article to be driven, I employ springs D, which bear against the jaws, and are applied thereto in any suitable manner.

I do not limit myself to the use of two jaws shown in the drawings, as the number of the same may be varied as desired.

The jaws are held in place by the plates E, which are screwed to the adjacent portions of the stock, and being removable permit access to the jaws when the same is required.

Having thus described my invention, what I claim as new, and desire to secure by Letters Patent, is—

1. In a lathe-carrier, a stock, in combination with a screw working through said stock, substantially as described, and pivoted jaws, the latter having working-faces, substantially as and for the purpose set forth.

2. A lathe-carrier having the stock A, the set-screw B, the pivoted jaws C, and spring D, said jaws having working-faces, substantially as described.

3. A lathe carrier or stock having a set-screw working through said stock, pivoted jaws, and springs pressing against said jaws, all combined and operating substantially as described.

CHAS. W. SHARTLE.

Witnesses:
JOHN A. WIEDERSHEIM,
A. P. GRANT.